US009177286B2

(12) United States Patent
Manucha et al.

(10) Patent No.: US 9,177,286 B2
(45) Date of Patent: Nov. 3, 2015

(54) FREE TRADE QUALIFICATION METHOD AND SYSTEM

(75) Inventors: Rajiv Manucha, Toronto (CA); Steven Lloyd Crozier, Toronto (CA); Marc Roy, Toronto (CA); Antonio Guiliano, Bolton (CA)

(73) Assignee: Management Systems Resources, Inc., Toronto (CA)

( * ) Notice: Subject to any disclaimer, the term of this patent is extended or adjusted under 35 U.S.C. 154(b) by 1870 days.

(21) Appl. No.: 12/327,555

(22) Filed: Dec. 3, 2008

(65) Prior Publication Data

US 2010/0138256 A1   Jun. 3, 2010

Related U.S. Application Data

(60) Provisional application No. 60/992,410, filed on Dec. 5, 2007.

(51) Int. Cl.
G06Q 10/00 (2012.01)
G06G 1/12 (2006.01)
G06Q 30/00 (2012.01)
G06F 7/00 (2006.01)
G06Q 10/10 (2012.01)
G06Q 10/08 (2012.01)
G06Q 40/04 (2012.01)

(52) U.S. Cl.
CPC .............. *G06Q 10/10* (2013.01); *G06Q 10/087* (2013.01); *G06Q 40/04* (2013.01)

(58) Field of Classification Search
USPC .......................................................... 705/28
See application file for complete search history.

(56) References Cited

U.S. PATENT DOCUMENTS

| 6,526,443 | B1* | 2/2003 | Goldsmith et al. ........... 709/224 |
|---|---|---|---|
| 7,305,392 | B1* | 12/2007 | Abrams et al. ................ 707/770 |
| 2003/0191674 | A1* | 10/2003 | Hale et al. ......................... 705/7 |
| 2003/0212604 | A1* | 11/2003 | Cullen, III ...................... 705/26 |
| 2004/0167789 | A1* | 8/2004 | Roberts et al. .................... 705/1 |
| 2005/0262008 | A1* | 11/2005 | Cullen et al. .................... 705/37 |
| 2006/0173775 | A1* | 8/2006 | Cullen et al. .................... 705/37 |
| 2006/0212335 | A1* | 9/2006 | Stier ................................. 705/8 |
| 2008/0228822 | A1* | 9/2008 | Jarboe et al. ............... 707/104.1 |
| 2009/0157524 | A1* | 6/2009 | Cullen, III ...................... 705/26 |

* cited by examiner

*Primary Examiner* — Ashford S Hayles
(74) *Attorney, Agent, or Firm* — Blank Rome, LLP

(57) ABSTRACT

A free trade qualification system to determine whether finished products qualify for a given free trade agreement. Bill of materials maintenance uses tables that constitute the bill of materials, including an item master table and an item relationship table. The item master table contains records for the parts and finished products. The item relationship table contains all relationships between items structured as parent to child in a recursive manner. Free trade qualification traverses the bill of materials to calculate whether a given finished product is qualified. The harmonized tariff code for the part or subassembly being processed is evaluated in terms of the appropriate qualification rules to determine which of these rules applies to the part in the context of its relationship to the subassembly being processed.

15 Claims, 6 Drawing Sheets

FREE TRADE QUALIFICATION METHOD AND SYSTEM

CROSS REFERENCE TO RELATED APPLICATIONS

This application claims the benefit under 35 U.S.C. §119(e) of U.S. Provisional Patent Application Ser. No. 60/992,410, entitled "Free Trade Qualification Method and System" by Rajiv Manucha, Steven Crozier, Marc Roy and Antonio Giuiano, filed Dec. 5, 2007, which is hereby incorporated by reference.

BACKGROUND OF THE INVENTION

1. Field of the Invention

The present invention relates to importing and exporting and, more particularly, to a method, apparatus and free trade qualification system for determining whether goods intended for import or export across jurisdictional boundaries qualify for one or more trade agreements.

2. Description of the Related Art

The importing and exporting of goods across jurisdictional boundaries, such as between states or nations, is a well-known phenomenon. As a result of increased globalization and the rise of multinational corporations, the trade in goods across borders continues to grow and accelerate. For individual companies the ability to control the total landed cost involved with each transaction is key to success in this arena, as is the ability to ensure that they are in compliance with the myriad laws and regulations governing the international trade process.

Under bilateral and multi-lateral free trade agreements any product manufactured in one or more countries that are party to such an agreement may be traded duty free between all member countries. For manufacturers of products, tariff preference under one of these agreements can be worth millions of dollars and it is critical that accurate assessments are made.

With increased globalization and competition, companies cannot afford to not take advantage of trade agreements, mainly free trade agreements. Even small and mid size companies have started taking advantage of free trade agreements and the number will increase as companies increase the usage of preferential trade agreements in future. Among larger companies. a broader range of industries are using or are planning to use free trade agreements. Previously, only large companies were working under free trade agreements. Now that segment has expanded to include an array of other industries and will continue to grow.

Free trade agreements have extensive rules and regulations that must be followed to determine if a particular product may be considered compliant and thus qualify for trade with eliminated or reduced tariffs. These rules of origin take into account where goods are produced, what materials are used to produce them, and costs associated with the materials and their processing. Only goods that qualify under the rules of origin for a particular free trade agreement can obtain tariff preference under that agreement.

In addition to several such basic rules to determine "originating" designation, there are a large number of exceptions and special conditions that need to be considered before a decision can be made regarding the eligibility of the finished product. In addition, the products involved could include thousands of components, each of which in turn can be broken down further into multiple levels of subassemblies and individual components. Presently human specialists review the bill of materials (BOM) of the products to determine if it qualifies. Even with such experts this takes an inordinate amount of time, sometimes months, for complex products.

Automation of this process, if sufficiently accurate and efficient, would be of great value to companies engaged in international trade, especially those dealing with complex products with many parts or ingredients. However the very complexity that would make automation valuable also makes the requisite level of performance difficult to obtain under standard practice methods.

The main problem involves the method of representing the bill of materials. Two methods are usual when using bills of materials in other business operations such as manufacturing. The first method represents the BOM structure using typical relational hierarchy with tables representing each level of the BOM. This method can be used only for finite Bills of Material. Another method is to represent the BOM using two tables. The parent table represents the finished good (or sub-component) and the child table representing the commodities/parts/raw materials and quantities used to make up the finished good (or sub-component). The first method greatly limits the ability of the process to represent the bills of materials of the very complex multi-component products for which automation would be most useful. The second method, though somewhat more flexible, still carries a certain amount of redundancy and is very slow to process.

Accordingly, it is desired to provide a method and system required to change the presentation of bills of materials which addresses several problems inherent to standard bills of materials presentation.

SUMMARY OF THE INVENTION

Embodiments of the present invention provide a free trade qualification system (FTQS) that enables a member of a supply chain to determine whether any or all of their finished products qualify for a given free trade agreement.

The FTQS system divides the qualification process into two parts: bill of materials maintenance and free trade qualification. Bill of materials maintenance creates and maintains the database tables that constitute the bill of materials. These database tables are designed to support maximally efficient operation of the subsequent free trade qualification process.

The tables that make up the bill of materials consist of an item master table and an item relationship or BOM table. The item master table contains detailed records for the parts and finished products involved in import and export transactions. For finished products, the item master table contains a record for the finished product, as well as records for all parts, components, subassemblies or ingredients contained within the finished product. The item relationship or BOM table consists of a table containing any and all relationships between items in the item master table. These relationships are structured to relate pairs of items as parent to child in a recursive manner. For example, a subassembly represented in the item master table can be the child in one pair (i.e., with the finished good of which it is a part) and a parent in others (i.e., with each of the parts or other subassemblies that go into making it). By recursively relating records in the item relationship table to each other in this way it is possible to represent an infinite number of BOM levels with no redundancy. This is an advantage over other, more traditional methods of BOM representation.

The free trade qualification process traverses the bill of materials according to a series of rules to calculate whether a given finished product is qualified for the free trade agreement in question. The harmonized tariff code for the part or subassembly being processed is evaluated in terms of other qualification rules in a qualification rule cross-reference table to determine which of these rules, if any, applies to the part in the context of its relationship to the subassembly being processed.

BRIEF DESCRIPTION OF THE DRAWINGS

The present invention has other advantages and features which will be more readily apparent from the following detailed description of the invention and the appended claims, when taken in conjunction with the accompanying drawings, in which:

DETAILED DESCRIPTION OF THE PREFERRED EMBODIMENT

Figure 1:
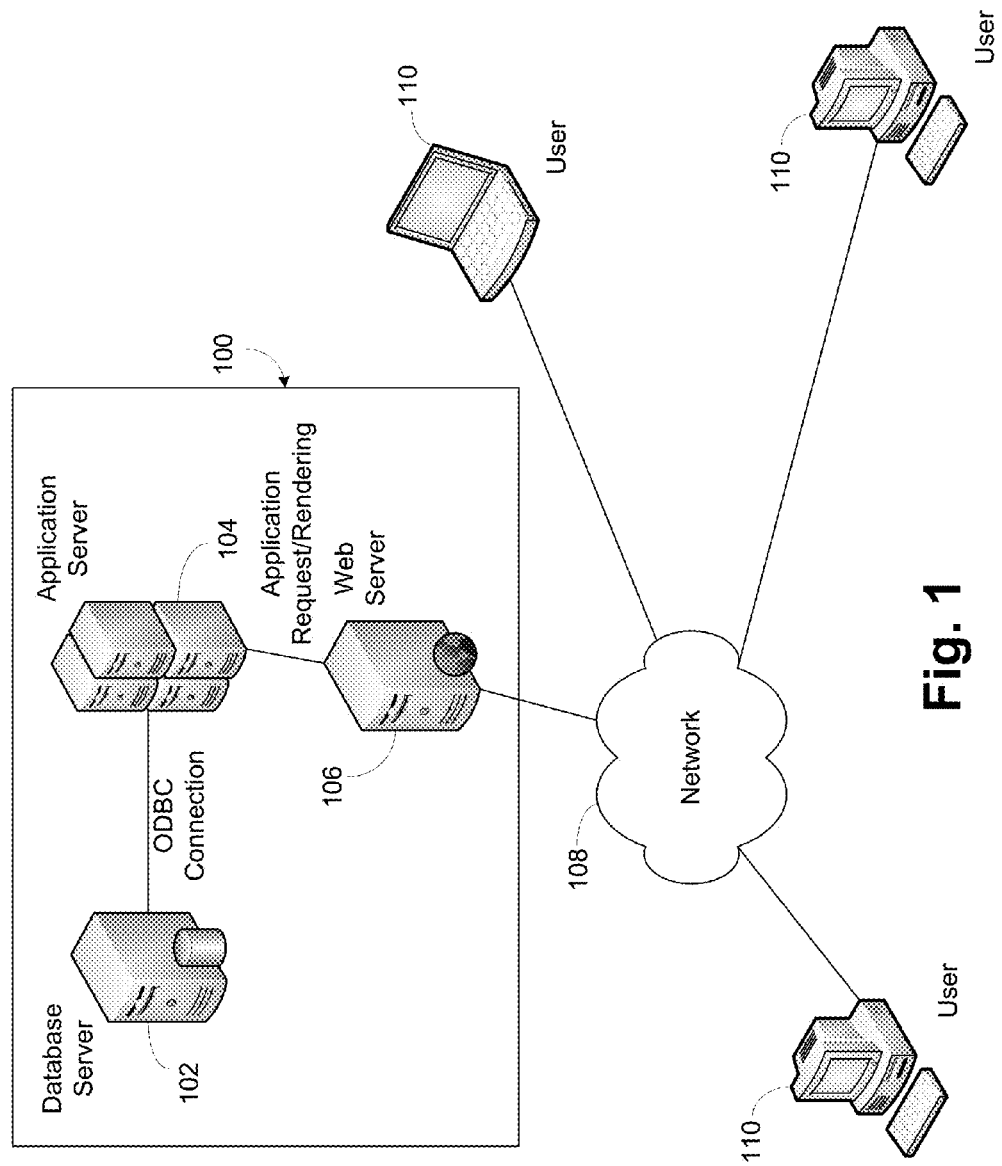
FIG. 1 is a block diagram of an FTQS according to the present invention.
Figure 2A:
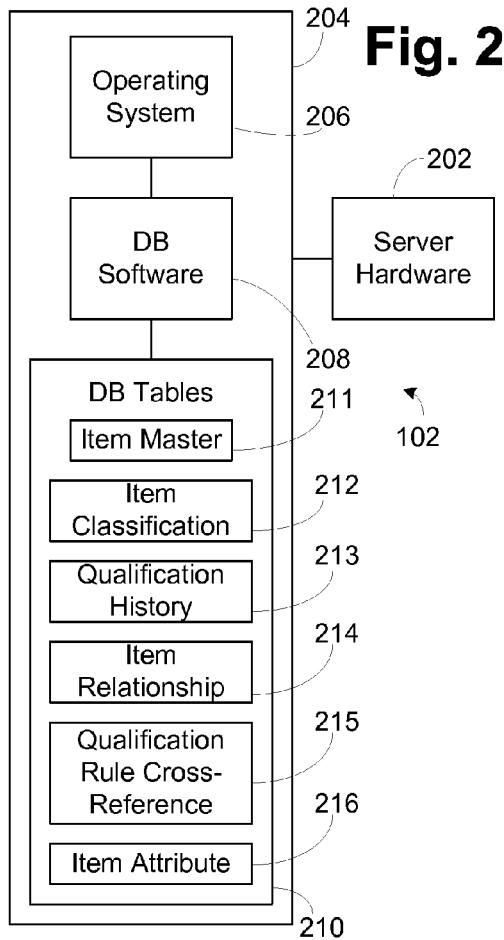
FIGS. 2A-2D are block diagrams of the hardware, software and data of the computers of FIG. 1.
Figure 2B:
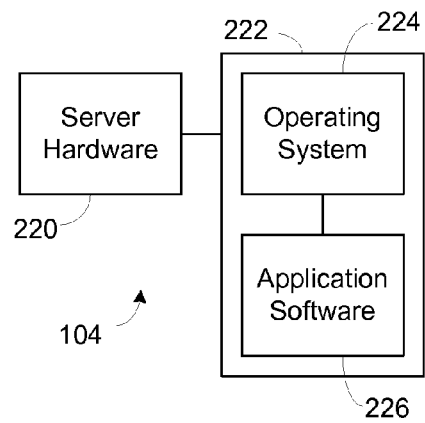
Figure 2C:
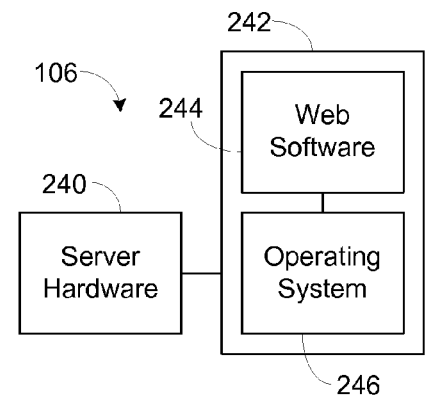
Figure 2D:
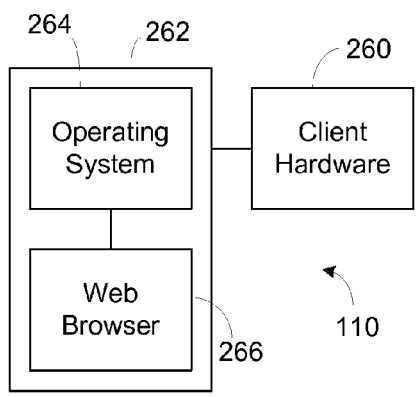

Referring now to FIGS. 1 and 2A-2D, the FTQS 100 is client-server and web based in the preferred embodiment. The FTQS 100 can be provided on an application service provider (ASP) or software as a service (SaaS) model or hosted by the corporation using it, as either a single or multi-branch configuration. Communication between client workstations and the server computers will be provided by the Internet, intranet, LAN, WAN or a combination.

The application is hosted on a server system consisting of one or more computers in communication with each other among them performing the functions of a database server 102, an application server 104 and a web server 106. Though illustrated as three separate computers, a greater or lesser number of computers can be utilized.

Each server will carry out different portions of the overall functionality of FTQS 100 as reflective of the name of the servers (e.g., database server 102, application server 104 and web server 106).

The application server 104 takes requests from the web server 106 and processes them and returns the result back to the web server 106. The requests are usually data manipulation requests and the application server 104 closely interacts with the database server 102. The application server 104 also processes and formats the web pages prior to returning them back to the web server 106, performing functions that the web server 106 cannot do itself due to inherent web server limitations. In the preferred embodiment, the application server 104 includes server hardware 220 and storage 222. Windows 2003 server from Microsoft is the preferred operating system 224 stored by the storage 222. It is understood that this is exemplary and can evolve over time to use different operating systems. The application server 104 also includes, as part of its application software 226 stored on the storage 222, an open data base connectivity (ODBC) server to enable received ODBC compliant messages to be interpreted and executed by the database server 102 and, additionally, to generate and transmit ODBC compliant messages.

The web server 106 includes server hardware 240 and storage 242, which includes an operating system 246 and web server hosting software 244 capable of receiving HTTP requests, receiving data posted to HTML or XML pages, interpreting received requests, retrieving requested web pages (e.g., HTML or XML pages), transmitting retrieved pages and transmitting other data through use of HTTP. In the preferred embodiment web server hosting software 244 is provided using Microsoft IIS including the .NET framework, though it is understood that other web environments can be used.

The database server 102 includes server hardware 202 and storage 204, which includes an operating system 206 and a database management system (DBMS) 208, which hosts the database 210. The DBMS 208 in the preferred embodiment is implemented using conventional SQL compliant relational database management (RDBMS) software such as those available from IBM, Microsoft, Oracle and the like. The DBMS 208 operates to create, maintain, update, query and otherwise control data stored on the storage 204 in data tables, which form the database 210.

The storage 204, 222 and 242 are examples of computer readable medium or media having computer-executable instructions stored thereon for operating the FTQS 100 to perform method embodiments according to the present invention.

The FTQS 100 can be accessed by members of the supply chain using: conventional workstation, hand-held, PDA and other devices, all illustrated as computers 110. Each computer 110 includes client hardware 260 and storage 262. In the preferred embodiment, the operating system 264 of these devices 110 is a suitable version of Microsoft Windows, though other operating systems can be used. The computers 110 in communication with server system hosting application have client software such as a browser 266, i.e., Microsoft Internet Explorer in the preferred embodiment, though it is understood that other browsers such as Firefox, Opera and Safari can be used. The client-side computers 110 have access to the FTQS system via a network 108, which network can be the Internet, an intranet LAN or WAN connection or a combination.

The computers 110 provide access to the personnel of different supply chain members based on user profiles set up to allow secure access to functions required. For example, importers have different access from exporters and various employees within importer and exporter firms also have differing access.

The FTQS method as described below can also be carried out on other configurations of hardware and software. One example is provided in U.S. Pat. No. 7,406,472 for "Integrated Import/Export System."

The database 210 contains tables that store data directly pertinent to the free trade qualification process. These tables include an item master table 211, an item classification table 212, a qualification history table 213, an item relationship or BOM table 214, a qualification rule cross-reference table 215 and an item attribute table 216. The function of each of the above-identified tables is described below.

The item master data table 211 provides a sufficient description for each item (finished good or part, component or ingredient) involved in the qualification process to enable the item to be classified under the Harmonized Tariff System of the importing and/or exporting country. The item master table 211 also contains a part number, net cost and transaction value and information about the country of origin of the item, among other types of information.

The item classification data table 212 provides, for items imported into or exported from a specified country or jurisdiction, data relating to tariff data (Harmonized codes), duty data (codes and rates), value added and excise tax data (codes and rates), last date for which an update of the information was completed, quota data and the like. The item classification table 212 may be referenced by the item master table 211.

The qualification history table 213 contains records of all completed qualifications for each finished good and subcomponent. The qualification rule cross-reference table 215 contains the tariff shift rule for each heading, subheading or tariff item, as appropriate, representing a finished good or component plus an indication of whether the item is subject to a regional value content rule instead of or in addition to the tariff shift rule. The item attribute table 216 contains values used to calculate percentages of originating goods, which is needed for various rules.

The item relationship or BOM table 214 defines the relationships between items in the item master table 211. These relationships are structured to relate pairs of items as parent to child in a recursive manner. For example, there can be several such records for each finished good, each relating the finished good to one subassembly or part. In turn, each subassembly will have one record relating it to each of its subcomponents or parts and so on.

The item master table 211 and the item relationship table 214 together define the bill of materials database. An individual bill of materials list itemizing the composition of any finished good can be created by navigating through these tables, collecting all item relationship records in which the finished good is the parent. Then the bills of materials for any subassemblies collected in this step are collected in a similar manner by using the child from the previous step as the parent in the next. This can go on until the level of elemental parts is reached.

In the preferred embodiment, the database 210 can contain other data tables such as a contact table containing contact information regarding importers, exporters and other supply chain members; and certificate tables, in which the qualified items are used in free trade certificates, among others.

Figure 3:
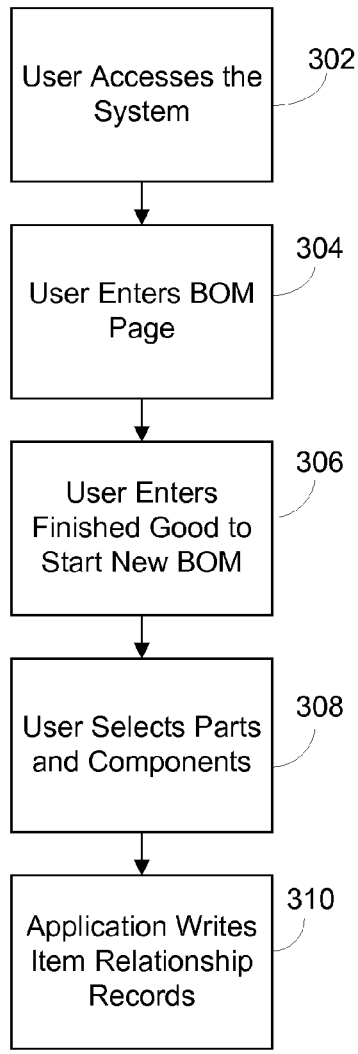
FIG. 3 is a flowchart of an embodiment of development of bills of materials, including items and relationships, according to the present invention.

The FTQS 100 includes a user interface and system logic for building a bill of materials. FIG. 3 illustrates the basic method for bill of materials creation. At step 302, the user accesses the application server 104 via the user's computer 110 and may enter a user identification code and password. At step 304, the user initiates the web browser page for bill of materials creation. At step 306, the user enters a code for the finished good for the desired BOM to be built. At step 308, the user selects the parts and subassemblies to be included in the bill of materials. At step 310, the application writes the set of records relating the finished good to each of the parts or subassemblies of which it is made.

The FTQS 100 may also include an automated method for extracting BOM data from another application, such as an ERP system, and converting into the database structure described above. For a complex finished good, the process of bill of materials creation requires creating a subsidiary bill of materials for each subassembly down the hierarchy until the level of elemental parts was reached.

Figure 4:
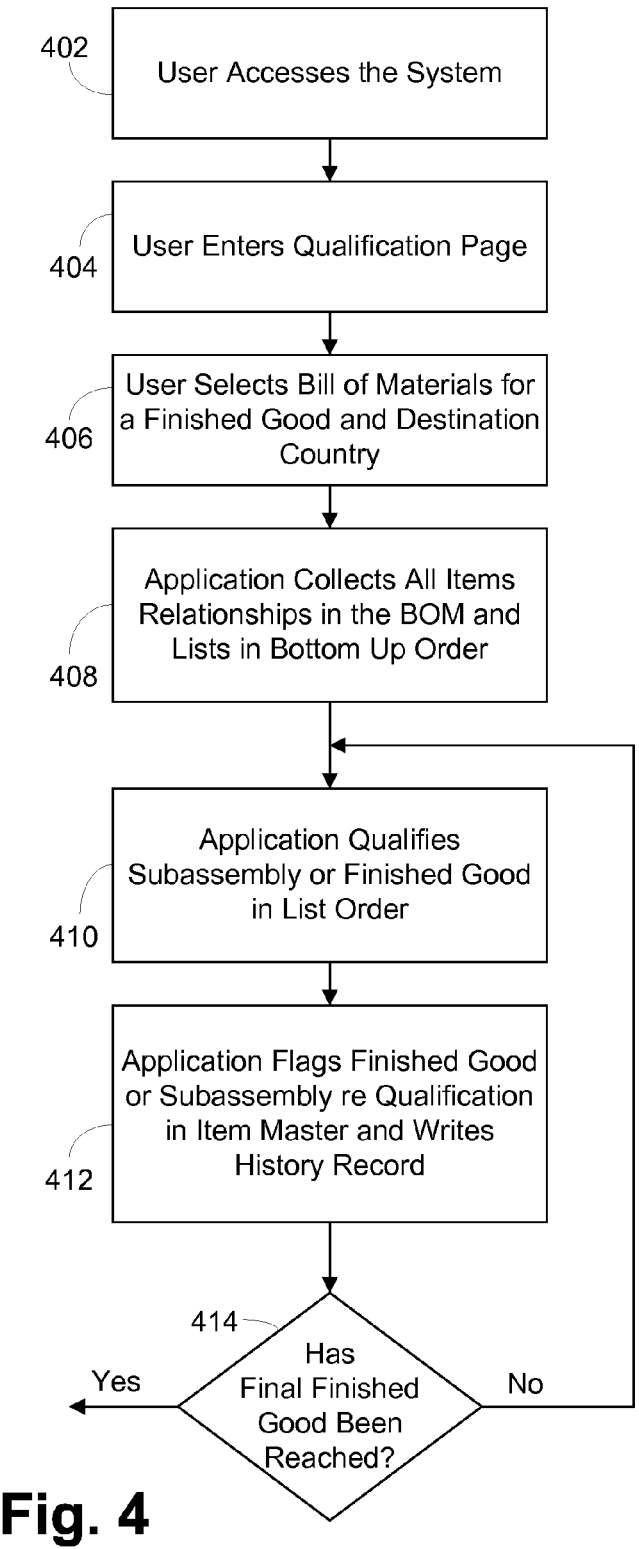
FIG. 4 is a flowchart of an embodiment for determining free trade qualification according to the present invention.

The FTQS 100 includes a user interface and system logic for free trade qualification of the finished good and subassemblies in a bill of materials. FIG. 4 illustrates a preferred method for free trade qualification. At step 402, the user accesses the application server 104 via the user's computer 110 and may enter a user identification code and password. At step 404, the user initiates the web browser page for free trade qualification. At step 406, the user enters a code for the bill of materials for the finished good to be qualified and enters the destination country.

At step 408, logic on the application server 104 navigates through the item relationship table 214 from the top down, collecting all the item relationships that constitute the bill of materials for the finished good selected. The result is a hierarchical list of all items down to the elemental (or raw material level).

Steps 410 and 412 are carried out iteratively from the bottom up, (i.e., starting with subassemblies containing only elemental parts) to qualify each successive level of subassemblies, record that qualification and then repeat for the next level of subassemblies until arriving at the level of the finished good.

At step 410, logic on the application server 104 qualifies each subassembly in the group being processed in this iteration (or the finished good if at the top level). In step 412, the application flags the subassembly or finished good as qualified or not qualified, writes the flagged record back to the item master table 211 and writes records to the qualification history table 213. At step 414 it is determined if the last item in the finished good has been completed. If not, step 410 is performed for the next item in the list. If so, qualification is complete.

In an alternate embodiment, instead of traversing each level of the BOM to develop the bottom up list, each tree branch can be traversed down to its lowest level, the raw material level, and then worked up and across the BOM. The embodiment would start processing at the first subassembly in the finish good. A check would be made to determine if the free trade qualification had already been completed for that item. If not, any subassemblies are obtained. Processing proceeds to the first lower level subassembly, where the previous determination is checked. If not, any subassemblies are obtained. The cycle repeats until raw materials or lowest level items are obtained. As they will have a qualification value, processing would proceed to the next subassembly at that level. When all subassemblies are completed for a given subassembly, the trade qualification value for that completed subassembly is returned and processing continues on the higher level subassembly.

In both embodiments a given item is only evaluated one time. In the embodiment of FIG. 4, this is because it is only listed in the full bottom up list one time. In the alternate embodiment this is because when the item is checked a second time, a qualification result is present and no further processing down the branch need be done.

Figure 5:
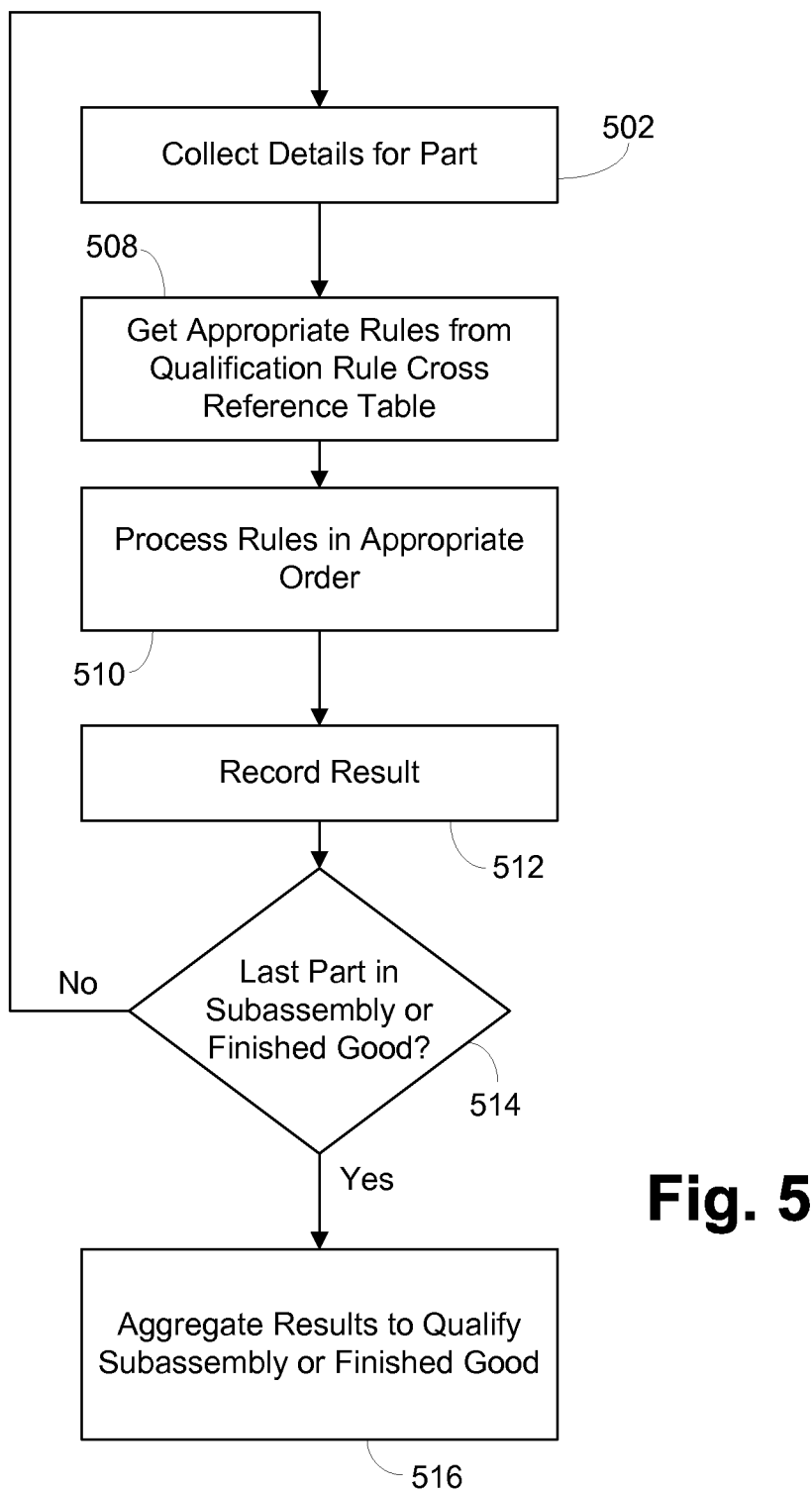
FIG. 5 is a flowchart of an embodiment for analyzing subassemblies and finished goods for free trade qualification according to the present invention.

FIG. 5 shows the details of the method of step 410, as it is executed for each subassembly or the finished good. In step 502, the item master and item classification tables 211 and 212 are referenced to collect detailed information for the part that will be necessary for the qualification.

If the part does not originate in a qualifying country as determined in step 506, step 508 is executed next. In step 508 the qualification rule cross reference table 215 is consulted to obtain the appropriate rules for the subassembly. In an example for North American Free Trade Agreement (NAFTA) qualification, this is a determination if the regional value rule and/or the tariff shift rule applies to the part in the context of its relationship to the subassembly being processed. Once the appropriate rule has been determined, step 510 is executed to process the rule. In the case of NAFTA, this proceeds as follows:

If the tariff shift rule applies, the harmonized code of the part is compared with that of the subassembly of which it is a part. If the degree of shift specified in the rule for that subcomponent has occurred, the part is considered originating.

If regional value applies, two formulas for regional value will be calculated, one assuming all parts are of non-originating content and the second comparing net and transactional costs versus originating and non-originating materials.

Once the part has been determined as originating or non-originating according to the appropriate rules, the result is recorded in step 512.

If this is the last part for the subassembly as determined in step 514, the application proceeds to step 516, aggregating the results for all the parts to determine the final qualification of the subassembly. If not, it iterates to process the next part, starting at step 502.

The FTQS 100 also includes reports and queries to allow the user to examine and report on bills of materials, qualification history records and the qualification status of finished goods and subassemblies in the item master table. Additionally, the FTQS 100 may include aspects relating to certification management, where an importer can request a certificate and the exporter or seller provides the desired information and requests the FTQS 100 to produce the certificate. Preferably sufficient information is maintained in the database 210 to allow for auditing of the certificate.

Figure 6:
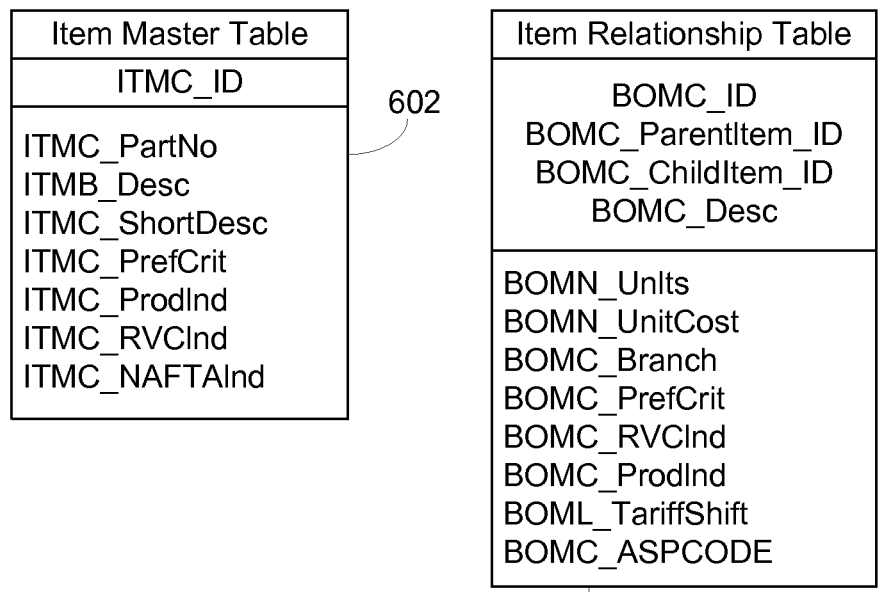
FIG. 6 is a listing of table structures of an embodiment according to the present invention.
Figure 6:
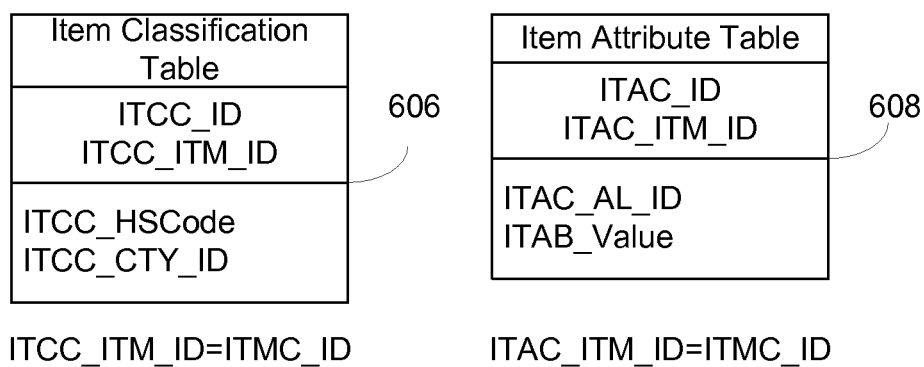

FIG. 6 illustrates exemplary data tables 602, 604, 606 and 608 for the item master table 211, the item relationship or BOM table 214, the item classification table 212 and the item attribute table 216. The items below the table name are the preferred keys for the tables. The relationship between the tables is shown by the lines indicating the ITMC_ID equals either the BOMC_ChildItem_ID or BOMC_ParentItem_ID, that is the contents of those two fields contain the relevant item in the item master table. BOMC_ID is a unique record number which provides a reference to the specific record. BOMC_Desc is a bill of materials number which is a user assigned number representing the bill of materials. BOMC_ParentItem_ID is a reference to the item master table 211 indicating the assembly or subassembly. BOMC_ChildItem_ID is a reference to the item master table 211 indicating the item making up the parent item. Other fields in the item master table 211 and the item relationship table 214 as provided in Tables 1 and 2.

TABLE 1

Item Master Table 211

| Field Name | Field Description |
|---|---|
| ITMC_ID | Information is stored in the Bill of material file |
| ITMC_Partno | Information used as a lookup and is stored as the BOM_Desc |
| ITMC_ShortDesc | Information used for lookup purposes on the BOM |
| ITMC_PrefCrit | This Field Stores the Pref Criteira of the Item |
| ITMC_ProdInd | This Field Stores the Producure Indicator of the Item |
| ITMC_RVCInd | This Field Stores the RVC indicator of the Item |
| ITMC_NAFTAInd | This Field Stores whether the Product qualifies or not. |

TABLE 2

Item Relationship Table 214

| Field Name | Field Description | Comment |
|---|---|---|
| BOMC_ID | Unique Identifier of the record | |
| BOMC_ParentItem_ID | Pointer to the item master parent record | One self referencing table |
| BOMC_ChildItem_ID | Pointer to the item master child record | |
| BOMN_Units | Number of units required for the finished good. | These are required to calculate the % of Originating goods |
| BOMN_UnitCost | Field required during the Qualification process it is multiplied by the Units | These are required to calculate the % of Originating goods |
| BOMC_Branch | Field used to track the level and branch of the item in the BOM | |
| BOMC_Prefcrit | Field used to store the part Pref crit | |
| BOMC_RVCInd | Field used to store the part RVC Indicator | |
| BOMC_ProdIND | Field used to store the part Producer Indicator | |
| BOML_TariffShift | Fields track weather this part shifts to the finish good's HS Code | |
| BOMC_ASPCODE | Used to separate customer record in a single database. | |

Exemplary fields in the item classification table 212 and the item attribute table 216 are illustrated in Tables 3 and 4.

TABLE 3

Item Classification Table 212

| Field Name | Fields Description | Comment |
|---|---|---|
| ITCC_ID | Unique identifier | |
| ITCC_ITM_ID | Item master Link | |
| ITCC_HSCode | HS Code required to look up FTA rules | Important to the rules object to get the appropriate rules for country |
| ITCC_CTY_ID | Link To the Country table of the HS Code. | |

TABLE 4

Item Attribute Table 216

| Field Name | Fields Description | Comment |
|---|---|---|
| ITAC_ID | Unique Identifier of the record | |
| ITAC_ITM_ID | Link to the item master record | |
| ITAC_AL_ID | Attribute (two we required Transaction Value and Net Cost Value) | These are required to calculate the % of Originating goods |
| ITAB_Value | Value of the Attribute | These are required to calculate the % of Originating goods |

Table 5 is an example of the item relationship table 214 for a television:

TABLE 5

| BOMC_ID | BOMC_Desc | BOMC_ParentItem_ID | BOMC_ChildItem_ID |
|---|---|---|---|
| (unique #) | TV (Model A) | TV-ModA656 | TV Tube |
| (unique #) | TV (Model A) | TV-ModA656 | Cabinet |
| (unique #) | TV (Model A) | TV-ModA656 | Legs |
| (unique #) | Cabinet | Cabinet-ModA | Wood Box |
| (unique #) | Cabinet | Cabinet-ModA | Knobs |
| (unique #) | Wood Box | Wood-ModA | Wood Panels |
| (unique #) | Wood Box | Wood-ModA | Screws |

In processing the above BOM, the user would select to process the "TV (Model A)." The application would then select all items from the BOM table with a "BOMC_Desc" of "TV (Model A)." It would then go through those selected items and determine if the child items "BOMC_ChildItem_ID" are a BOM item themselves. This check for further BOM items can be done by searching the BOMC_ParentItem_ID field for the values of the BOMC_ChildItem_ID. If not a BOM item itself, then the item is at a bottom level, otherwise the child BOM is included in the expansion, and these items are iteratively processed to see if they also contain BOMs.

Figure 7:
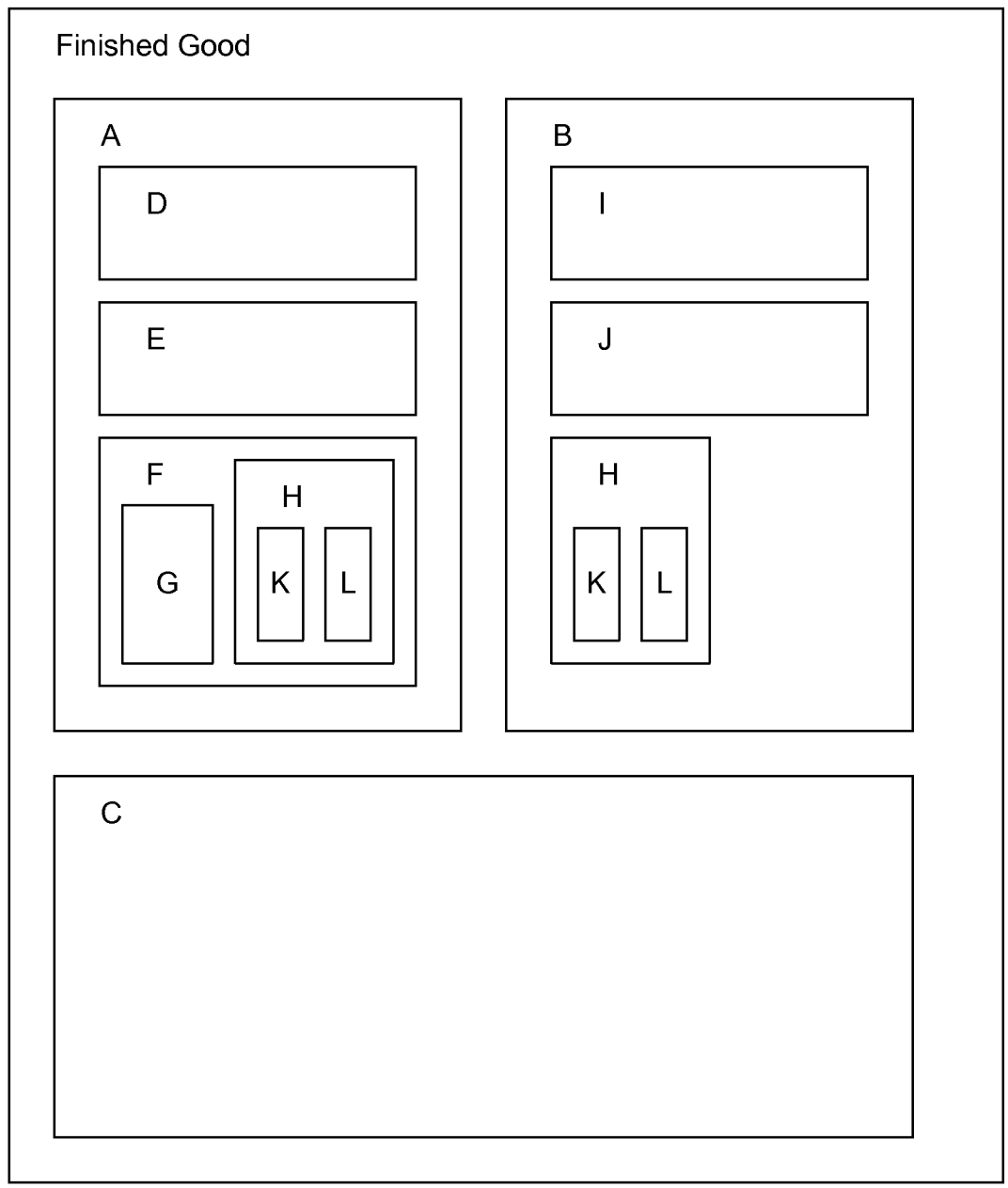
FIG. 7 is a block diagram of a finished good and its subassemblies to serve as an example for the full trade qualification according to the present invention.

FIG. 7 provides a graphical example of a finished good, with various assemblies and subassemblies. In the format of the above Table 5, the finished good of FIG. 7 would have entries in the item relationship table 214 as shown in Table 6.

TABLE 6

| BOM_Desc | BOMC_ParentItem_ID | BOMC_ChildItem_ID |
|---|---|---|
| Finished Good BOM | Finished Good | A |
| Finished Good BOM | Finished Good | B |
| Finished Good BOM | Finished Good | C (Raw Materials) |
| A BOM | A | D (Raw Materials) |
| A BOM | A | E (Raw Materials) |
| A BOM | A | F |
| F BOM | F | G (Raw Materials) |
| F BOM | F | H |
| H BOM | H | K (Raw Materials) |
| H BOM | H | L (Raw Materials) |
| B BOM | B | I (Raw Materials) |
| B BOM | B | J (Raw Materials) |
| B BOM | B | H |

As can be seen, the H subassembly is described once in the item relationship table 214, although it is referenced twice in the BOM as a subassembly of two other parts.

While the invention has been described for free trade qualification, such as NAFTA, it is understood that the invention applies to other treaties and agreements and to qualifications other than for free trade. Examples of other agreements include Least Developed Country Trade Agreement, New Zealand Trade Agreement, Australia Trade Agreement and Canada—Costa Rica Free Trade Agreement. Examples of other qualifications include determination of percent of value of non-originating material in ex-factory price, percent of value of non-originating material in cost of production, restriction to certain Tariffs, production restriction to production in particular geographical areas, etc.

While the invention has been disclosed with respect to a limited number of embodiments, numerous modifications and variations will be appreciated by those skilled in the art. It is intended, therefore, that the following claims cover all such modifications and variations that may fall within the true spirit and scope of the invention.

What is claimed is:

1. A method for operating a computer system to determine trade qualification of an item, the item containing a plurality of subassemblies, each subassembly potentially containing a plurality of subassemblies or being a base entry, the method comprising:
   the computer system maintaining a database of item records, with one record for each subassembly, each item record containing fields for information about the subassembly, including information relating to trade qualification;
   the computer system maintaining a database or relationship records, with each relationship record indicating a parent-child relationship between subassemblies;
   the computer system determining from a user an item to be trade qualified;
   for the determined item, the computer system selecting each subassembly which is present in the item utilizing the relationship records;
   the computer system traversing the selected subassemblies and determining trade qualification information for each subassembly based on the subassembly's constituent subassemblies using the item records;
   the computer system storing the determined trade qualification information for each subassembly as the determination is completed;
   the computer system determining the trade qualification information for the item based on its direct constituent subassemblies; and
   the computer system storing the determined trade qualification information of the item; and
   the computer system producing and storing a certificate for an item based on the stored determined trade qualification information of the item, wherein the stored certificate is available for access to a user.

2. The method of claim 1, wherein the selected subassemblies are listed in bottom up order, and wherein the listing is traversed when traversing the selected subassemblies and determining trade qualification information.

3. The method of claim 1, wherein the trade qualification information for each subassembly is stored in the item record of the subassembly.

4. The method of claim 1, further comprising:
the computer system maintaining a database of qualification rules and a database of item attributes,
wherein determining trade qualification information for each subassembly includes referencing the qualification rule database and the item attribute database.

5. The method of claim 4, wherein trade qualification is for the North American Free Trade Agreement, and
wherein the qualification rules include regional value and tariff shift rules.

6. A non-transitory computer readable medium or media having computer-executable instructions stored thereon for operating a computer system a perform a method to determine trade qualification of an item, the item containing a plurality of subassemblies, each subassembly potentially containing a plurality of subassemblies or being a base entry, the method comprising:
maintaining a database of item records, with one record for each subassembly, each item record containing fields for information about the subassembly, including information relating to trade qualification;
maintaining a database or relationship records, with each relationship record indicating a parent-child relationship between subassemblies;
determining an item to be trade qualified;
for the determined item, selecting each subassembly which is present in the item utilizing the relationship records;
traversing the selected subassemblies and determining trade qualification information for each subassembly based on the subassembly's constituent subassemblies using the item records;
storing the determined trade qualification information for each subassembly as the determination is completed;
determining the trade qualification information for the item based on its direct constituent subassemblies; and
storing the determined trade qualification information of the item; and
producing and storing a certificate for an item based on the stored determined trade qualification information of the item, wherein the stored certificate is available for access to a user.

7. The computer readable medium or media of claim 6, wherein the selected subassemblies are listed in bottom up order, and
wherein the listing is traversed when traversing the selected subassemblies and determining trade qualification information.

8. The computer readable medium or media of claim 6, wherein the trade qualification information for each subassembly is stored in the item record of the subassembly.

9. The computer readable medium or media of claim 6, the method further comprising:
the computer system maintaining a database of qualification rules and a database of item attributes, wherein determining trade qualification information for each subassembly includes referencing the qualification rule database and the item attribute database.

10. The computer readable medium or media of claim 9, wherein trade qualification is for the North American Free Trade Agreement, and wherein the qualification rules include regional value and tariff shift rules.

11. A computer system for determining trade qualification of an item, the item containing a plurality of subassemblies, each subassembly potentially containing a plurality of subassemblies or being a base entry, the computer system comprising:
a database server maintaining a database of item records, with one record for each subassembly, each item record containing fields for information about the subassembly, including information relating to trade qualification and maintaining a database or relationship records, with each relationship record indicating a parent-child relationship between subassemblies; and
an application server coupled to said database server for determining from a user an item to be trade qualified;
for the determined item, selecting each subassembly which is present in the item utilizing the relationship records;
traversing the selected subassemblies and determining trade qualification information for each subassembly based on the subassembly's constituent subassemblies using the item records;
storing the determined trade qualification information for each subassembly as the determination is completed;
determining the trade qualification information for the item based on its direct constituent subassemblies; and
storing the determined trade qualification information of the item; and
producing and storing a certificate for an item based on the stored determined trade qualification information of the item, wherein the stored certificate is available for access to a user.

12. The computer system of claim 11, wherein the selected subassemblies are listed in bottom up order, and wherein the listing is traversed when traversing the selected subassemblies and determining trade qualification information.

13. The computer system of claim 11, wherein the trade qualification information for each subassembly is stored in the item record of the subassembly.

14. The computer system of claim 11, further comprising:
said database server maintaining a database of qualification rules and a database of item attributes, wherein determining trade qualification information for each subassembly includes referencing the qualification rule database and the item attribute database.

15. The computer system of claim 14, wherein trade qualification is for the North American Free Trade Agreement, and
wherein the qualification rules include regional value and tariff shift rules.

* * * * *